United States Patent
Kasravi et al.

(10) Patent No.: US 10,117,802 B2
(45) Date of Patent: Nov. 6, 2018

(54) BLIND DOG NAVIGATION SYSTEM

(71) Applicants: Hunter K Kasravi, West Bloomfield, MI (US); Kas Kasravi, West Bloomfield, MI (US)

(72) Inventors: Hunter K Kasravi, West Bloomfield, MI (US); Kas Kasravi, West Bloomfield, MI (US)

(*) Notice: Subject to any disclaimer, the term of this patent is extended or adjusted under 35 U.S.C. 154(b) by 0 days.

(21) Appl. No.: 15/795,242

(22) Filed: Oct. 26, 2017

(65) Prior Publication Data
US 2018/0110672 A1   Apr. 26, 2018

Related U.S. Application Data

(60) Provisional application No. 62/413,394, filed on Oct. 26, 2016.

(51) Int. Cl.
  *G06G 7/50* (2006.01)
  *A61H 3/06* (2006.01)
  *A01K 27/00* (2006.01)

(52) U.S. Cl.
  CPC .......... *A61H 3/061* (2013.01); *A01K 27/002* (2013.01); *A01K 27/008* (2013.01); *A01K 27/009* (2013.01); *A61H 2003/063* (2013.01)

(58) Field of Classification Search
  CPC .. A01K 11/008; A01K 27/002; A01K 27/009; A01K 27/006; A01K 13/006; A61H 3/061; A61H 3/068; B60N 2/2863
(Continued)

(56) References Cited

U.S. PATENT DOCUMENTS

| 6,367,424 B1 * | 4/2002 | Higham | A01K 13/006 119/766 |
| 7,602,302 B2 * | 10/2009 | Hokuf | A01K 11/008 340/539.13 |

(Continued)

OTHER PUBLICATIONS

Dog training collar by VINZO. Shock collar for pet training. A commercial products by VINZO.

*Primary Examiner* — Firmin Backer
*Assistant Examiner* — Munear Akki (57) ABSTRACT

The present invention relates to a device and a method associated with helping blind dogs navigate. With respect to the device, it is a set of one or more sensors and stimulators, which provide situational awareness to a blind dog regarding objects and sudden drops in its vicinity, helping the dog freely move about without the risk of collision or fall. The core components of the invention are a distance sensor, a microcontroller, a tactile/audio stimulator, an accelerometer, a power source, a control panel, a body harness, and a head wrap, which, generally speaking, are configured as follows: a frontal distance sensor mounted on top of a blind dog's head using the head band, the lower distance sensor, the stimulators, the microcontroller, the accelerometer, the power source, and the control panel are mounted on the blind dog using the body harness. With respect to the associated method, in order to carry out the method the following core steps are followed: a frontal distance sensor method to detect the objects in front of the blind dog and alert the blind dog when a collision is imminent, a drop sensor method to detect sudden drops in front of the blind dog and alert the dog when a fall is imminent, a velocity calibration method and a velocity computation method determine the movements of the dog based on accelerometer signals, and a velocity compensated alert method adjust and (Continued)

increase the alert distance/time when the dog is moving toward an obstacle or a drop.

25 Claims, 11 Drawing Sheets

(58) Field of Classification Search
USPC ......... 340/573.1, 573.2, 573.3, 573.7, 686.6, 340/435; 119/850, 837, 719; 54/83.1
See application file for complete search history.

(56) References Cited

U.S. PATENT DOCUMENTS

| | | | |
|---|---|---|---|
| 8,707,909 B2 | 4/2014 | Bordeaux | |
| 2002/0111048 A1* | 8/2002 | Kondoh | B60R 16/0207 439/34 |
| 2002/0152970 A1* | 10/2002 | Takeda | A01K 15/02 119/719 |
| 2005/0134440 A1* | 6/2005 | Breed | B60N 2/2863 340/435 |
| 2008/0088469 A1* | 4/2008 | Doemens | A61H 3/061 340/686.6 |
| 2008/0161987 A1* | 7/2008 | Breed | G08G 1/161 701/27 |
| 2010/0212269 A1* | 8/2010 | Dell'Agnese | A01K 27/002 54/37.1 |
| 2013/0169041 A1* | 7/2013 | Fukaya | B60R 16/0215 307/10.1 |
| 2017/0017839 A1* | 1/2017 | Hiramatsu | G06K 9/00664 |

* cited by examiner

BLIND DOG NAVIGATION SYSTEM

PRIORITY STATUS

This application claims the benefit of U.S. Provisional Application No. 62/413,394, filed Oct. 26, 2016. The content of U.S. Provisional Application 62/413,394 is incorporated herein by reference for all purposes.

BACKGROUND OF THE INVENTION

1. Field of the Invention

The present invention relates generally to a system for blind animals, and dogs specifically, helping them avoid collisions and falls.

2. Background

The present invention is directed at a system to help blind dogs navigate, and in general help blind dogs receive alternative non-visual signals in regards to object in front of them or drops in their paths. Dogs are among the most favorite of all domesticated pets, and currently there are an estimated 900 million dogs worldwide. For a variety of reasons dogs go blind and unable to see, which is of great distress to the dog and the owner. Blind dogs cannot navigate normally, run into objects around them, fall down stairs, and generally lead less active lives and subject to risks of injury and death. Blindness is a main cause of putting dogs down in dog shelters and elsewhere. There are an estimated 300,000 blind dogs in the United States.

Currently there are a number of solutions for helping blind dogs navigate. Some of these solutions attempt to train the dog to move about more cautiously and limit their roaming area, but these solutions fail to meet the needs of the industry because the dogs and owners need to go through extensive training, yet the dog is still limited in range and activities, and restricted to familiar areas, in which the training took place. Other solutions attempt to provide a physical halo around a dog's face, which helps the dog detect an object immediately in front of it upon the halo coming into contact with the object, but these solutions are similarly unable to meet the needs of the industry because the dog only has a sense of an object immediately in front of it, unable to run without collision, and the dog is offered no protection from a sudden drop, such as falling down a stair case.

It would be desirable to have a system that would help blind dogs to have a better sense of their surrounding (situational awareness), thus better navigate and move about without colliding with objects, including in new and unfamiliar surroundings. Further, it would be desirable to have a system that would allow blind dogs to run and play freely. Furthermore, it would also be desirable to have a system that would alert blind dogs about a sudden drop in front of them to avoid injuries or death due to falls. Still further, it would be desirable to have the above benefits with minimal training. Therefore, there currently exists a need in the industry for a system that provides blind dogs with better situational awareness with regard to their surroundings.

SUMMARY OF THE INVENTION

The present invention advantageously fills the aforementioned deficiencies by providing blind dog navigation system, which provides blind dogs with an improved situational awareness regarding their surroundings, allowing them to freely roam, run, and play, without the risk of collision, fall, injury, or death.

The present invention is a blind dog navigation system, which is made up of the following components: a body harness, a head band, a microcontroller, a frontal distance sensor, a stimulator, a power source, and a wiring harness. These components are related to each other as follows: the body harness is worn by the blind dog in the shoulder and torso area, the body harness provides pockets for storing components including the microcontroller, the power sources, and one or more stimulators. The head band is worn by the blind dog over the head and neck area, and it provides a platform for the frontal distance sensor over the top of the blind dog's head in a forward pointing manner. The frontal distance sensor and the stimulators are connected to the microcontroller. The power source provides power to the frontal distance sensor, the stimulators, and the microcontroller. The direction of frontal distance sensor is adjustable by the blind dog's owner. The logic program operates in the microcontroller and activates the stimulators based on the signals provided by the frontal distance. A wiring harness connects all the sensors, stimulators, microcontroller, and the power source. Similarly, the method associated with the present invention includes one or more of the following steps: the frontal distance sensor sends distance information to the microcontroller, the frontal sensor method in the microcontroller determines the risk of a collision based on the distance, and if necessary the microcontroller activates a stimulators to alert the blind dog of the presence of an object in front of it; optionally, the distance to an object is used to determine how the stimulator conveys a message to the blind dog. For example, the closer an object the higher the vibration frequency of a stimulator, or a louder audio signal.

The present invention optionally has one or more of the following: a control panel, a lower distance sensor, and an accelerometer. Similarly, the method associated with the present invention optionally includes one or more of the following steps: a drop sensor method, a velocity calibration method, a velocity computation method, and a velocity compensated alert method. The control panel provides an On/Off button, a status light, a reset button, and an optional learn button. The owner of the blind dog uses the control panel to interact with the system. The lower distance sensor is attached to the body harness between the blind dog's front legs in the chest area and points forward and downward. The owner can change the angle of the lower distance sensor to an optimum position for the dog. The lower distance sensor sends distance signals to the microcontroller. A drop sensor method in the microcontroller interprets the signals from the lower distance sensors, and alerts the blind dog via a stimulator about a sudden drop in front of the dog. The accelerometer is used to determine the traveling speed of the blind dog, which is used to compute the timing of an earlier alert to give a running dog the chance to slow down before striking an object. The present invention is unique when compared with other known devices and solutions because the present invention provides: (1) situational awareness by the dog via the use of distance sensors and stimulators; (2) a microcontroller to process the sensor signals; (3) a portable power source; and (4) an accelerometer to detect the motion of the dog. Similarly, the associated method is unique in that it: (1) provides appropriate alert to the dog about what is in the vicinity; (2) adjust the nature of the alert to gain insight about the distance to objects; and (3) adjust the alerts to compensate for the motion of the dog.

The present invention is unique in that it is structurally different from other known devices or solutions. More specifically, the present invention is unique due to the presence of: (1) distance sensors; (2) stimulators; (3) microcontroller; (4) portable power source; and (5) accelerometer. Furthermore, the process associated with the aforementioned invention is likewise unique and different from known processes and solutions. Further, the present invention's process owes its uniqueness to the fact that it: (1) provides alerts about objects some distance in front of the dog beyond the immediate vicinity; (2) provides alerts about sudden drops in front of the dog; and (3) compensates for the motion of the dog by providing earlier alert if the dog is running.

The present invention is superior to other systems because it provides: (1) reduction in training; (2) increase in the roaming range of the dog to new and unfamiliar environments; (3) advance alerts about collisions and drops not immediately in front of the dog; and (4) freedom for the dog to safely run and play.

Among other things, it is an object of the present invention to provide blind dog navigation system that does not suffer from any of the problems or deficiencies associated with prior solutions.

It is the objective of the present invention to protect the dog from injury or death by providing early alert about pending collisions with objects. It is a further objective to prevents falls by alert the dog about sudden drops in front of it. It is still further an objective of the present invention to provide the dog with a greater range for roaming, running, and playing. Further still, it is an objective of the present invention to minimize the training typically required by blind dogs, and ensure that the training is not location specific.

The present invention now will be described more fully hereinafter with reference to the accompanying drawings, which are intended to be read in conjunction with both this summary, the detailed description, and any preferred and/or particular embodiments specifically discussed or otherwise disclosed. This invention can, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The present invention is directed at a system to help blind dogs navigate, and in general help blind dogs receive alternative non-visual signals in regards to object in front of them or drops in their paths. In its most complete form, the present invention device is made up of the following components: a body harness, a head band, a microcontroller, a control panel, a frontal distance sensor, a lower distance sensor, a stimulator, a power source, a wiring harness, and an accelerometer. These components are related to each other as follows: the body harness is worn by the blind dog in the shoulder and torso area, the body harness provides pockets for storing the microcontroller, the power sources, the stimulators, and the wiring harness. The head band is worn over the blind dog's head and neck, and provides a platform for mounting the frontal distance sensor in a forward pointing fashion. The lower distance sensor is mounted on the body harness, in the chest area, and in between the dog's legs, pointing in a front and down fashion. At least one stimulator for each of the aforementioned distance sensors are mounted in the body harness, such that the resultant stimulation is felt by the dog without causing pain or irritation. The power source provides power to the aforementioned components. The aforementioned components are connected to each other via the wiring harness. The control panel has at least a status light, an On/Off button, and a reset button, which are collectively used to allow the owner to interact with the system.

The most complete form of performing the methods associated with the present invention device is a logic program consisting of the following steps: a frontal sensor method, a drop sensor method, a velocity calibration method, a velocity computation method, and a velocity compensated alert method. The following variables are used by the aforementioned methods: a Dmin, which is the minimum forward distance parameter to an object in front of the dog and the distance at which the frontal collision alert is at its peak; a Dmax, which is the maximum forward distance parameter to an object in front of the dog and the distance beyond which there is no risk of collision, hence no frontal collision alert; and a Ddrop (minimum drop distance parameter), which is the distance from the lower distance sensor to the ground lower than which the blind dog is safe from falling, and any distance larger than Ddrop presents a risk of fall and invokes a drop alert. The aforementioned distance parameters are set by the owner of the dog's safety preferences. The frontal sensor method monitors the signals from the frontal distance sensors and provides alerts via the stimulators as a function of Dmin and Dmax, as described below. The drop sensor method monitors the signals from the lower distance sensors and detects any sudden drop in front of the blind dog, when Ddrop is exceeded, and provides an alert via a stimulator, as described below. The stimulators are of any communication modality that would alert the dog, such as vibration, sound, or ultrasound. The distance sensors use any combination of available non-contact distance measuring modality, such as ultrasound; or infrared.

It should be noted that a period of training and adjustment by the blind dog and the owner is required for the dog to become comfortable with the device, interpret the signals provided by the stimulator, and learn to take appropriate action. Further, the head band and the body harness are made with materials that are comfortable for the blind dog. The head band and the body harness are made in different sizes and can be adjusted to different sized dogs. Still further, the choice of the power source is such that it cannot harm a blind dog, therefore low voltage rechargeable batteries without the risk of explosion are preferred.

Figure 1:
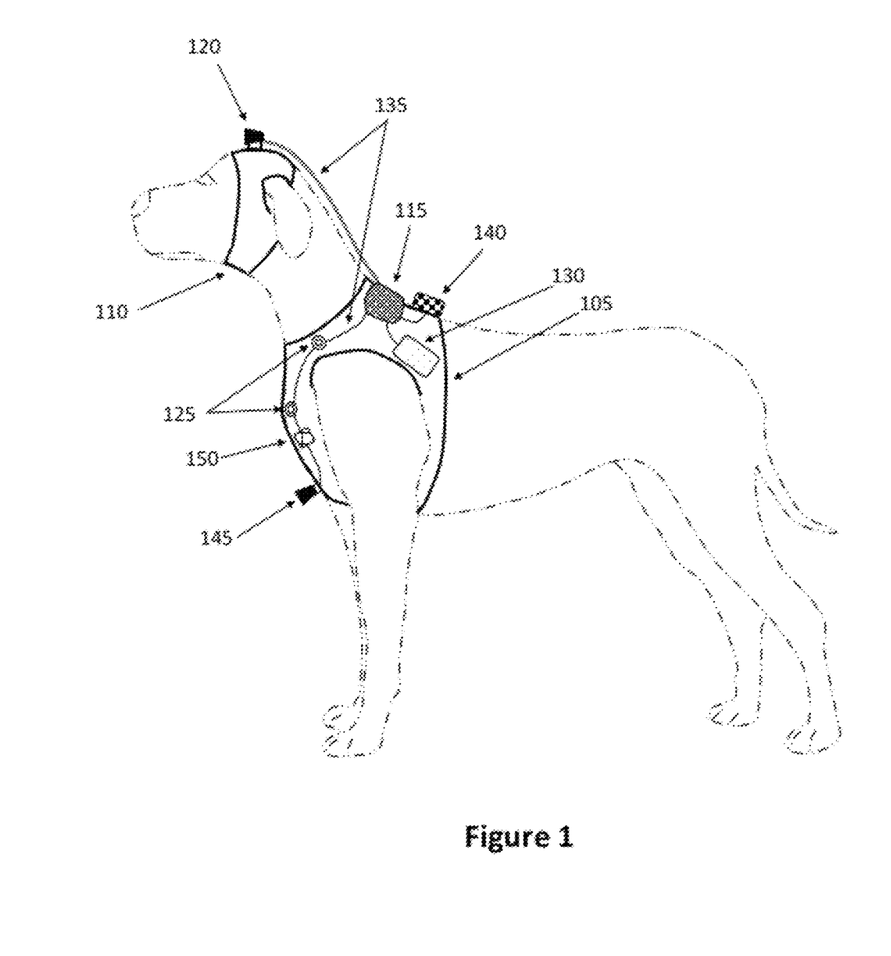
FIG. 1 shows a dog wearing the present invention.

As shown in FIG. 1, a body harness (105) is worn by a dog in the shoulder area, serves a platform for mounting other components, provides pockets for storing various components, and hides any required wiring. The body harness (105) has opening for the dog's front legs. A head band (110) is worn around the dog's head and neck, and serves as a platform for mounting other components. The head band (110) has opening for the dog's ears. Both body harness (105) and head band (110) are designed to be soft, snug, and comfortable for the dog to wear. A microcontroller (115) is mounted on the body harness (105). The microcontroller (115) is a microprocessor and memory capable of executing software instructions. A frontal distance sensor (120) is mounted on the head band (110). The frontal distance sensor (120) is mounted in a forward pointing manner, and provided angular adjustments to the owner so that the sensor element would point forward when the dog holds its head in a natural stance. The function of the frontal distance sensor (120) is to provide the microcontroller (115) with a signal indicating the distance of an object in front of the dog. In the preferred embodiment of the preset invention, the frontal distance sensor is an ultrasound frontal distance sensor to avoid the higher costs and potential harmful effects of other sensors such as laser distance sensors. At least one stimulator (125) is mounted on the body harness (105) and/or the head band (110). In the preferred embodiment, the stimulator (125) provides vibration and/or sound that the dog can sense through the body harness. The stimulator mounted on the dog's head is the forward collision stimulator, which detects any frontal collision, and the stimulator mounted on the dog's chest is the drop stimulator, which detects any potential drop of fall ahead of the dog. The strength of the stimulator is sufficient to alert the dog, but not cause discomfort. A power source (130) provides power all the components in the present invention that require power. In the preferred embodiment the power source is a rechargeable battery. A wiring harness (135) connects the microcontroller (115) and the power source (130) to other components such as the sensors and the stimulators. The wiring harness (135) is preferably tucked into the body harness and not visible. The part of the wiring harness (135) that connects the frontal distance sensor (120) to the microcontroller (110) and the power source (130) has an optional protective sheath; also, the same wire is optionally retractable or attached to the dog's collar to avoid tangling. An optional lower distance sensor (145) is centrally mounted on the body harness (105) between the dog's legs in such a manner that it points forward and downward. The owner can optionally adjust the angle of the lower distance sensor (145) to compensate for the size of the dog and ensure that the sensor points downward and forward. The function of the lower distance sensor (145) is to send a signal to the microcontroller (115) indicating the presence or absence of a sudden drop in front of the dog. In the preferred embodiment of the preset invention, the lower distance sensor is an ultrasound lower distance sensor to avoid the higher costs and potential harmful effects of other sensors such as laser distance sensors. An optional control panel (140) is mounted on the body harness (105) to allow the owner to control the device described in the present invention. An optional accelerometer (150) is mounted on the body harness (105), which provides the microcontroller (110) with signals indicating the movements of the dog.

Figure 2:
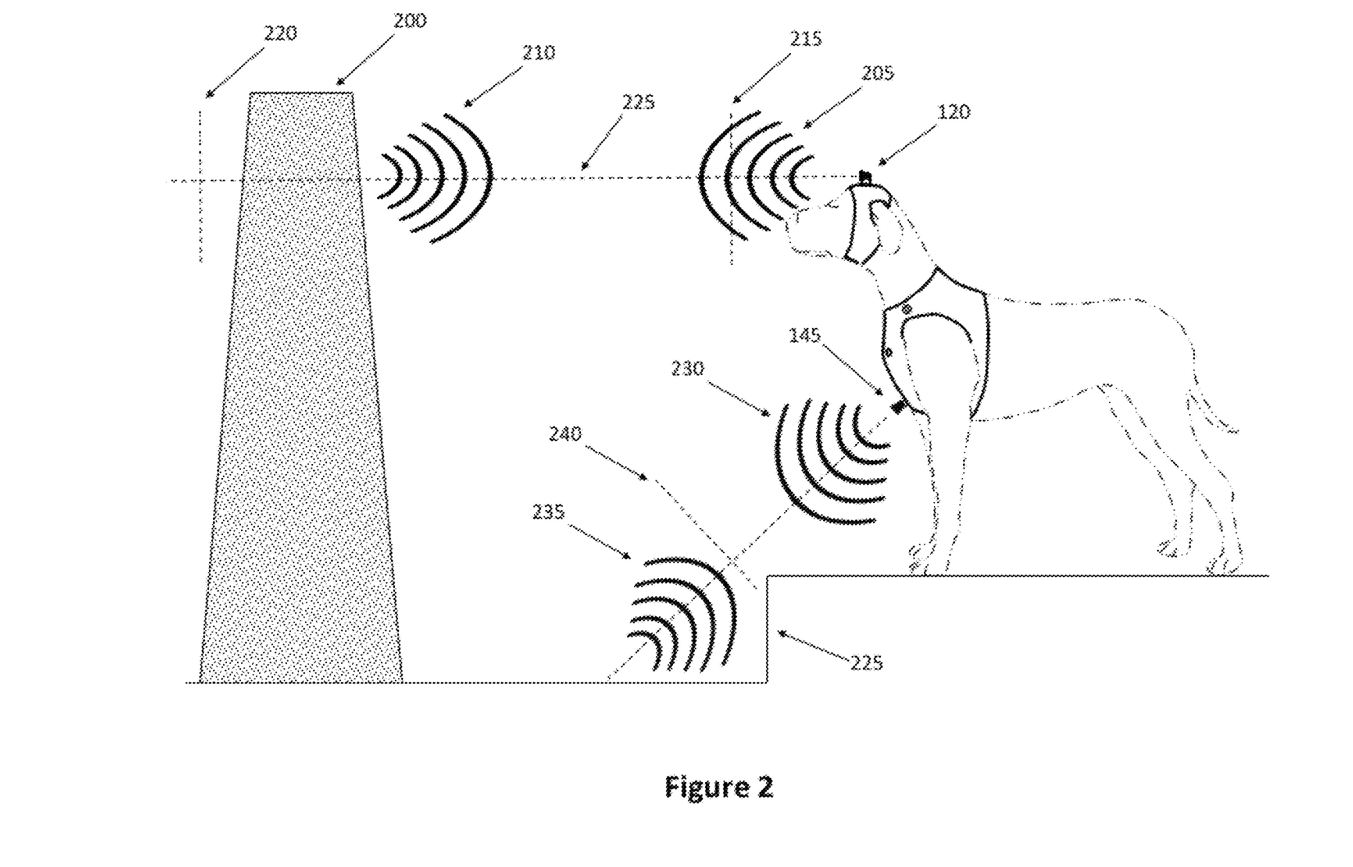
FIG. 2 shows the operations of the distance sensors.

FIG. 2 illustrates the operation of the frontal distance sensor (120) and the lower distance sensor (145). The distance sensors can use any combination of commonly available non-contact distance measurement techniques, such as ultrasound; or infrared. The distance sensors provide signals to the microcontroller (110) indicating the presence of absence of objects in front of them.

In the case of the frontal distance finder (120), the sensor emits ultrasound or light sending wave (205) and detect the returning wave (210) after striking and rebounding from an object (205). The timing between the sending wave (205) and the returning wave (210) along a distance vector (225) is used to compute the distance between the frontal distance sensor (120) and the object (200). A Dmin (215) distance is the minimum threshold, and a Dmax (220) distance is the maximum threshold. At Dmin an object is considered to be close enough to touch the dog, and at Dmax an object is considered to be too far to be relevant. Dmin is ideally just in front of the dog's nose, with a default value such as 30 cm, and can be adjusted by the owner using the control panel (140). Dmax is a reasonable distance in front of the dog where objects need to be detected to give the dog a sense of situational awareness. Dmax must be far enough to provide useful information to the dog, but not too far to overwhelm the dog with excessive sensory input by detecting every object in the vicinity. Dmax has a default value such as 100 cm. The signals received from the frontal distance sensor (120) by the microcontroller (110) are used to provide feedback to the dog via the stimulator (125). The dog can sway its head around to gain situational awareness by sensing the objects around it. In the preferred embodiment of the present invention the strength of the stimulator (125) signal associated with the frontal distance sensor (120) is inversely proportional to the distance. The strength of the stimulator can be frequency of vibration or loudness of a sound. Hence, maximum stimulator strength is indicated at Dmin, and minimum strength is indicated at Dmax. No stimulation is provided for objects beyond Dmax.

In the case of the lower distance sensor (145), the sensor can emit ultrasound or light sending wave (230) and detect the returning wave (235) after striking and rebounding from the surface in front of the dog. The timing between the sending wave (230) and the returning wave (235) is used to compute the distance between the lower distance sensor (145) and the surface in front of the dog. Ddrop (240) is the threshold indicating a sudden drop in front of the dog. A sudden drop (225) causes a substantial increase in distance beyond Ddrop (240), indicating an unsafe drop in the surface elevation in front of the dog. The lower distance indicator (145) sends signal to the microcontroller (110), which in turn activates a stimulator to alert the dog of a sudden drop in front of it. The dimension of Ddrop depends on the size of the dog and the angle of the lower distance sensor (145), and adjusted by the owner using the control panel (140). If the distance to surface in front of the dog is less than Ddrop, then no alert is issued. If the distance increases beyond Ddrop, then the dog is alerted via a stimulator (125) allocated to the lower distance sensor (145).

The stimulators (125) assigned to the frontal distance sensor (120) and the lower distance sensor (145) are preferably different in nature and located on different parts of the body harness, so that the dog would more easily discern between the alerts and take appropriate action to avoid a collision or fall.

Figure 3:
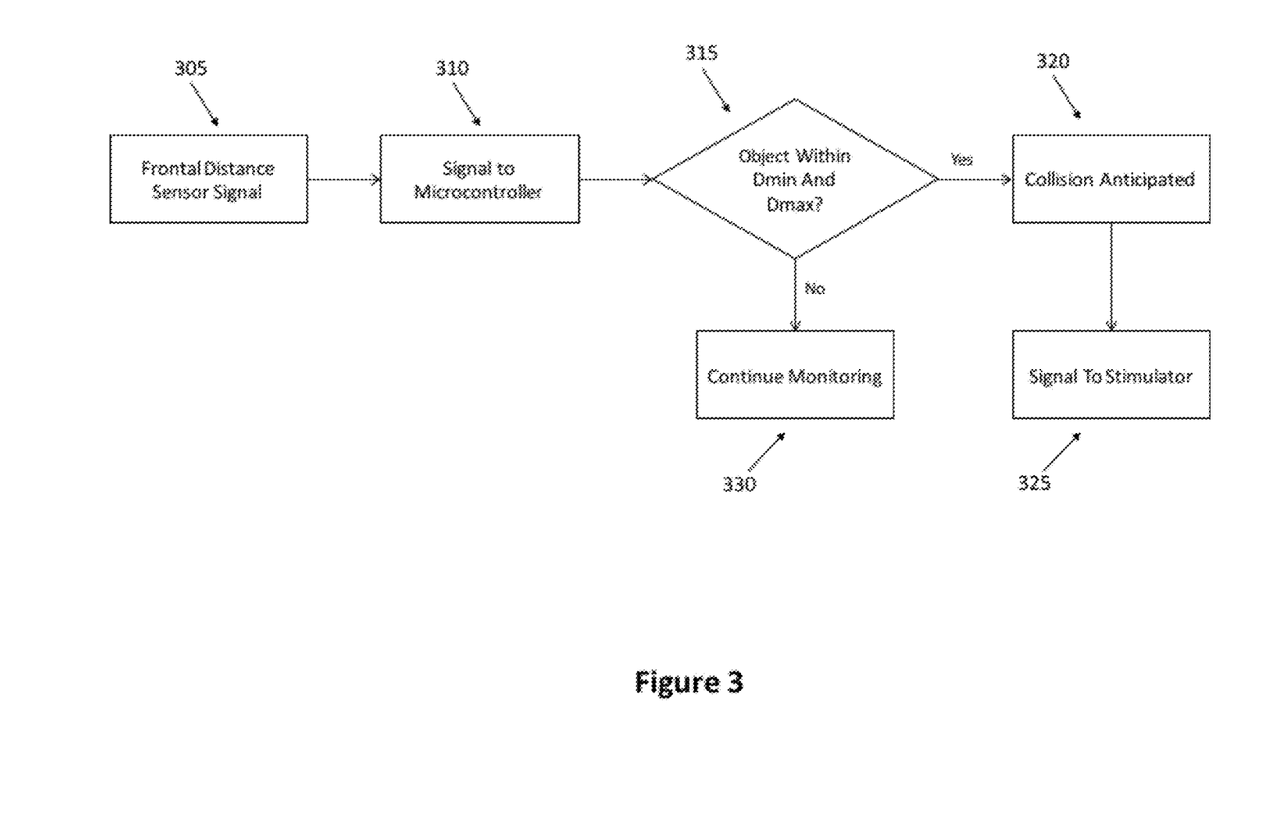
FIG. 3 shows the method for avoiding collisions.

With reference to FIG. 3, the frontal distance sensor signal (305) is generated by the frontal distance sensor (120), where the signal strength is preferably indicative of the distance between the sensor and an object in front of it. A signal to microcontroller (310) is conveyed via wiring harness (135) to the microcontroller (115). An object within the range defined by Dmin and Dmax (315) is a conditional test of the said signal, where the values for Dmin and Dmax are stored in memory and compared with the incoming signal. If the signal indicates the presence of an object between Dmin and Dmax then a collision is anticipated (320) signal is invoked, which sends a signal to stimulator (325) to alert the dog. If the signal is not between Dmin and Dmax, then nothing happens and the continue monitoring (330) step is invoked to continue measuring distance to nearby objects. In the preferred embodiment, the strength of the signal to the stimulator (125) is inversely proportional to the distance measured by the sensor, such that the signal to the stimulator is at its maximum at Dmin and at its minimum at Dmax, thus the dog has a sense of distance from an object as a function of the strength of the alert provided by the stimulator (125).

Figure 4:
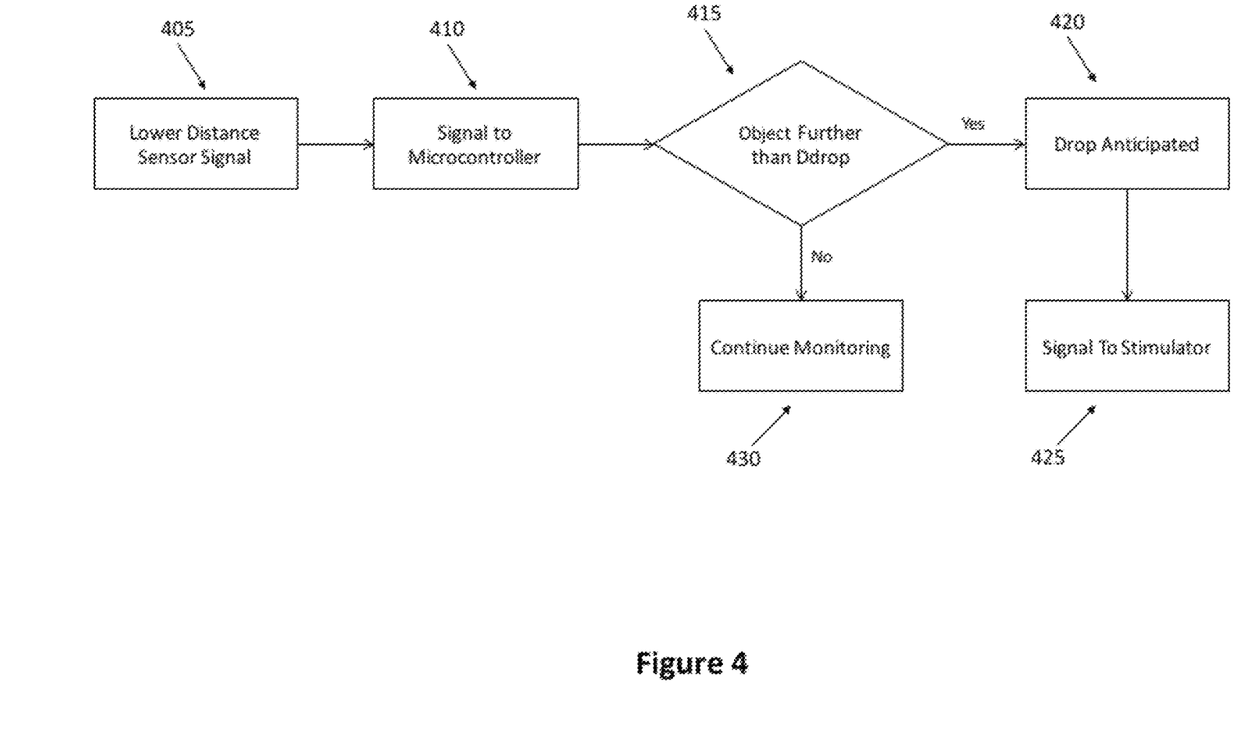
FIG. 4 shows the method for avoiding sudden drops.

With reference to FIG. 4, the lower distance sensor signal (405) is generated by the lower distance sensor (145). A signal to microcontroller (410) is conveyed via wiring harness (135) to the microcontroller (115). A surface further than Ddrop is tested in the object further than Drop (415) step, which is a conditional test of the said signal. If the signal indicates a distance greater than Ddrop then an alert is issued to the dog via a stimulator (125) indicating a sudden drop directly in front of the dog. If the signal is not less than Ddrop, then nothing happens and the continue monitoring (430) step is invoked to continue measuring distance to nearby surfaces.

Figure 5:
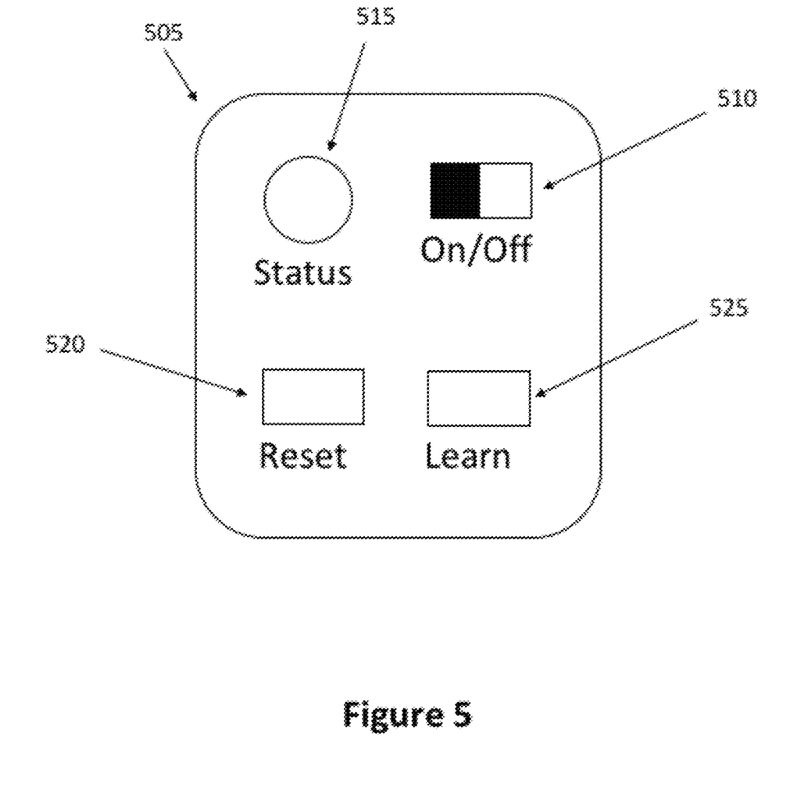
FIG. 5 shows the control panel.

FIG. 5 shows the control panel (140), which is mounted on the body harness (105) and connected to the microcontroller (115) and received power from the power source (130). The control panel is the interface between the present invention and the owner, and used for turns the system on/off, resetting the system, and customizing the settings such as adjusting Dmax and Ddrop values. The control panel (140) has a case (505), a status light (515), and On/Off button (510), and a reset button (520). Optionally, a learn button (525) is also present on the control panel (140). The status light would indicate if the system is on/off, but it would also indicate when alerts are presented to the dog, for example via flashing or changing color. This function is of value during training and monitoring the dog, by informing the owner of the stimuli received by the dog.

Figure 6:
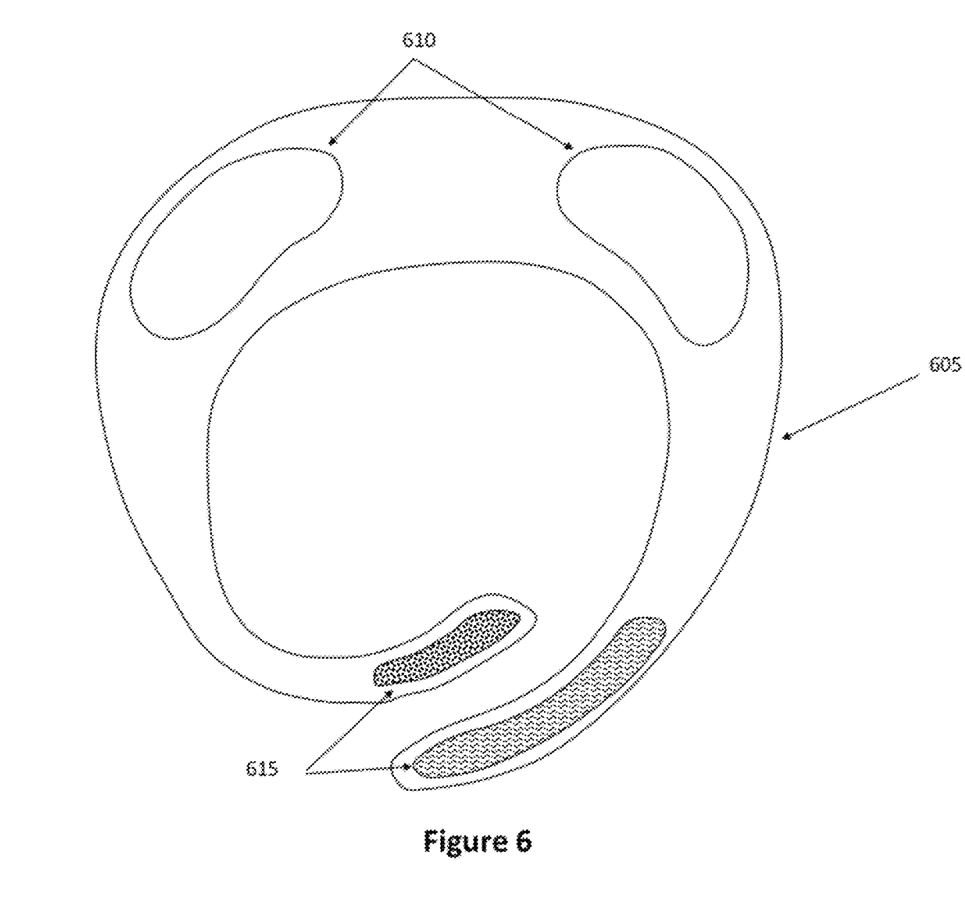
FIG. 6 shows the adjusting mechanism for body harness and head band.

FIG. 6 shows a sample of the body harness (105) and the head band (110). In both cases an adjustable wrap (605) is provided with openings (610) for the dog's front legs or ears. The body harness (105) is sized according to the size of the dog, and further adjustable for a snug fit using two straps with a fastening mechanism (615). In the preferred embodiment of the present invention the fastening mechanism (615) is hook & loop type fastener.

Figure 7:
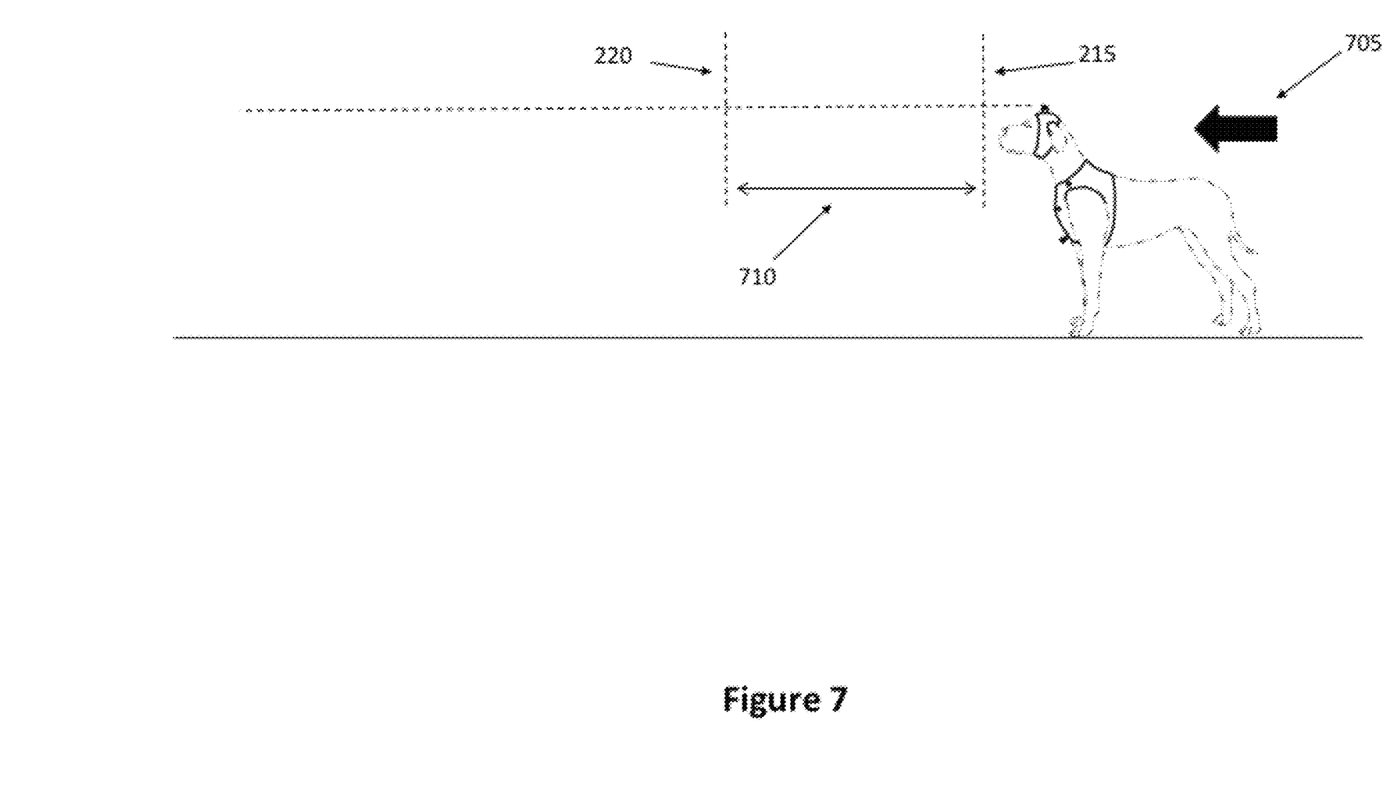
FIG. 7 shows alert velocity compensation at low speed.
Figure 8:
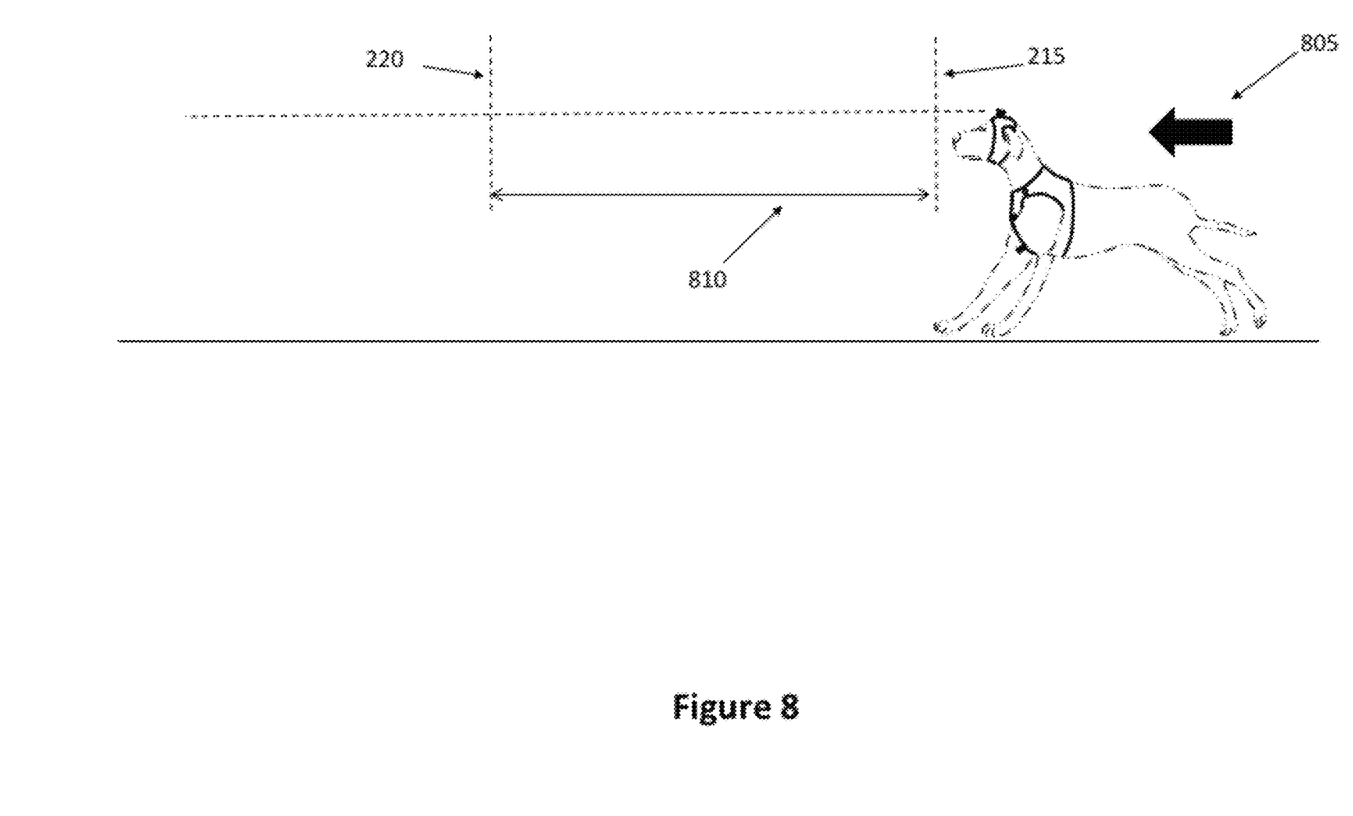
FIG. 8 shows alert velocity compensation at moderate speed.
Figure 9:
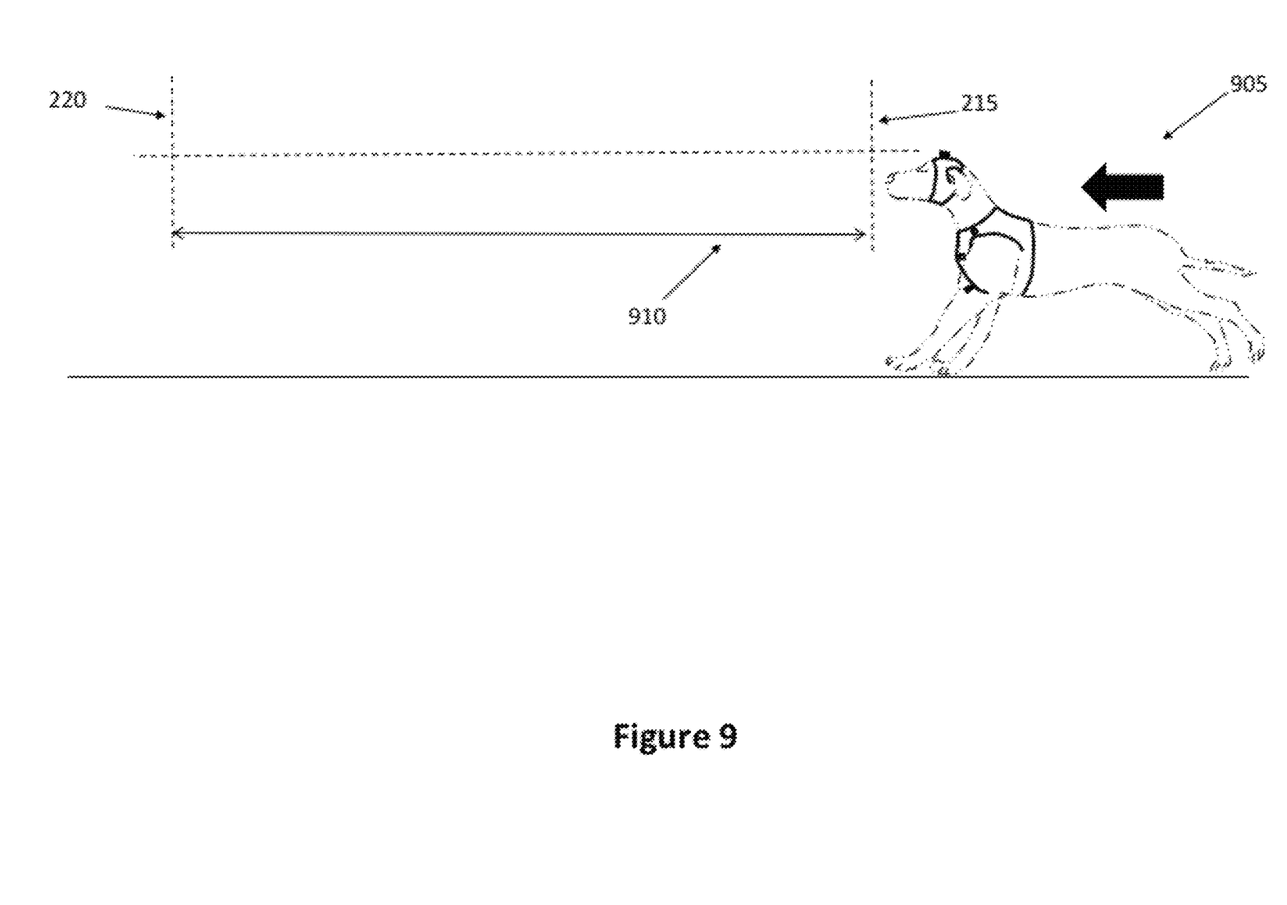
FIG. 9 shows alert velocity compensation at high speed.

FIGS. 7, 8, and 9 illustrate the adaptability of the present invention to how fast a dog moves. Dmax is used for the initial detection of an object that presents a risk of collision. At rest or when walking very slowly, Dmax only needs to be a short distance from the dog, for example 100 cm. However, as the dog walks fast or runs, Dmax increases to provide an alert to the dog in sufficient time for it to slow down and stop. Therefore, there is a direct relationship between Dmax and the velocity of the dog. In FIG. 7, the dog is standing, the velocity (705) is zero, and Dmax (710) is a short distance, for example 100 cm. In FIG. 8, the dog is walking fast where the velocity (805) is greater than zero, thus Dmax (810) is longer, for example 150 cm. In FIG. 9, the dog is running fast, the velocity (905) is high, and Dmax (910) has a larger value, for example 300 cm.

Figure 10:
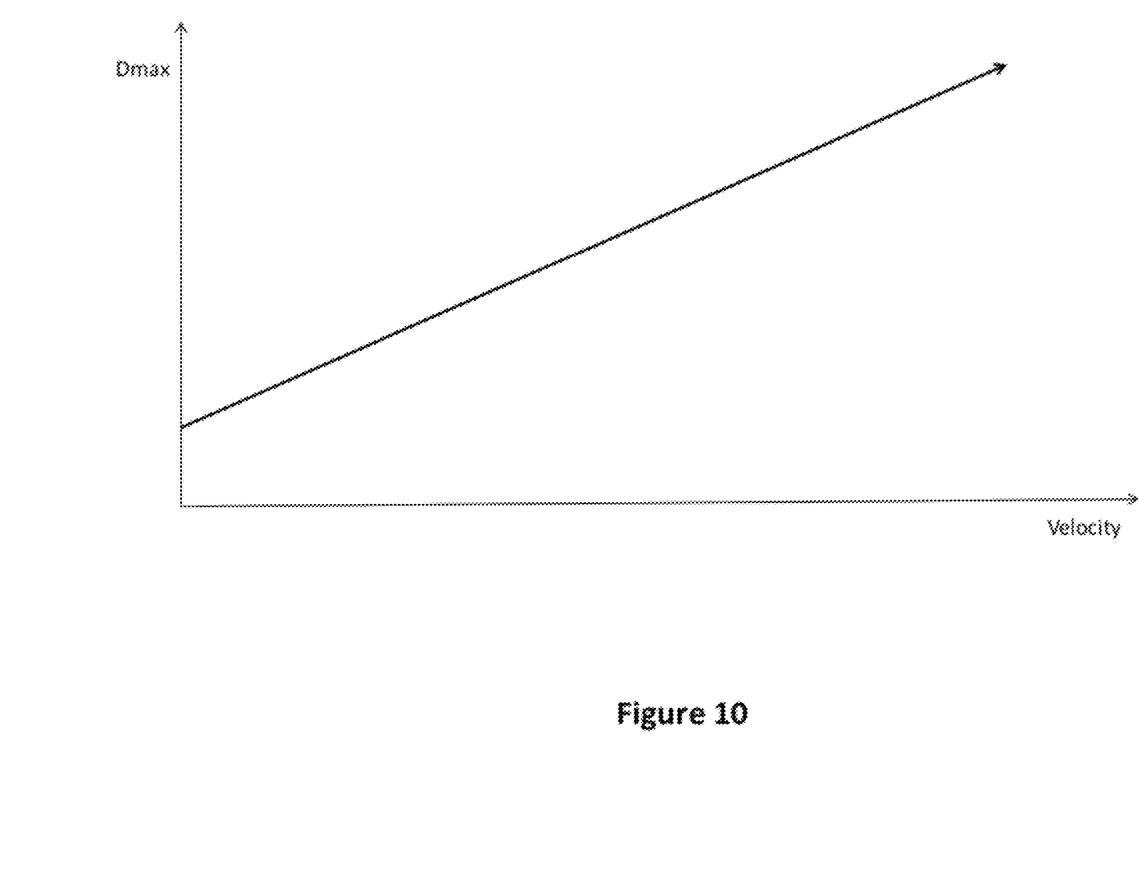
FIG. 10 shows a chart of velocity compensated alert.

The chart in FIG. 10 shows a linear relationship between velocity of the dog and Dmax. A linear equation for computing Dmax as a function of velocity, using the slope-intercept method, is in the form "Velocity=m·Dmax+b", where m is the slope and b is the value of Dmax when the dog is stationary. For example, the equation "Velocity=0.6× Dmax+100" can be used, which implies "Dmax=(Velocity−100)×0.6". The illustrated values for m and b are illustrative only and they can optionally vary for different dogs and situations. Also, the computation of Dmax is not limited to a linear equation, where non-linear and exponential functions can also be used to compute Dmax from Velocity.

Figure 11:
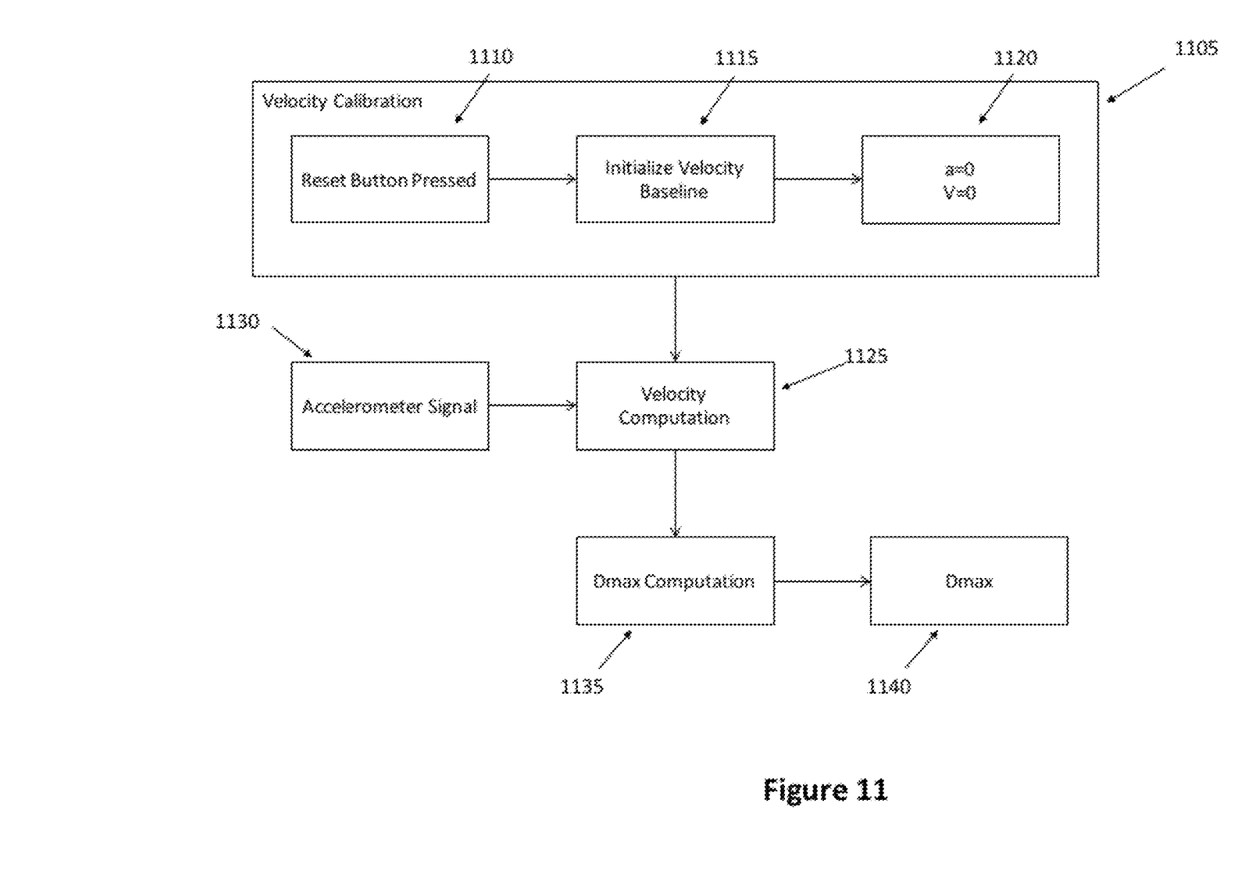
FIG. 11 shows the methods for velocity compensated alerts.

FIG. 11 shows the method for computing Dmax in the embodiment where Dmax responds to the movement of the dog. Velocity calibration (1105) is a method for computing the velocity of the dog based on the accelerometer (150) is measured along a single axis of movement, for example the X-axis only, indicating a forward motion. The acceleration value provided by the accelerometer (150) can be a positive value, indicating the dog is accelerating, or a negative value, indicating the dog is slowing down. The use of an accelerometer in velocity computation requires an initial state in which a dog is not moving. Therefore, the process begins by the owner holding the dog still, and press the Reset (520) button on the control panel (140). A reset button pressed (1110) step leads to an initialize velocity baseline (1115) step, which sets the current acceleration and velocity values to zero (1120). The velocity calibration (1105) step will have to be repeated from time to time to ensure accurate velocity computation. The accelerometer (150) samples the dog's movements at discrete events, for example every 0.05 second. Since "acceleration=change in velocity/change in time", the velocity computation (1125) step calculates the velocity at the said sapling rate and presents the current velocity of the dog. A small threshold value and averaging are used to minimize any noise associated with the accelerometer (150) signals. A Dmax computation (1135) step computes the current Dmax (1140) based on the current velocity computed by velocity computation (1125). An example of such computation is "Dmax=(Velocity−100)× 0.6". The Dmax value computed here is used in the object within Dmin and Dmax (315) step illustrated in the method of FIG. 3. Therefore, the dog receives an earlier alert when moving faster, thus being able to run and slow down when approaching an object at a high velocity.

It should be noted that the use of the present invention requires training. In such training, the dog is exposed to conditions where the stimulator (125) provides an alert, so that the dog would associate the alert with closeness to an object or approaching a sudden drop. This learning association can be rewarded by the owner when the dog avoids a collision of a fall. Such association is commonly known as Pavlovian conditioning, and can require repetition over time if the dog is not exposed to the target conditions, such as running or a facing a sudden drop.

The present invention has been fashioned for a blind dog, but a person of ordinary skill in the art would recognize that the system is equally applicable to other animals intelligent enough to develop the necessary response to the alerts. For example, blind chimpanzees and horses can also benefit from the present invention. It should be further noted that a person of ordinary skill in the art would also recognize that the wiring harness is replaceable by wireless communication, and a solar panel or an induction device can charge the batteries in the power source (130).

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

We claim:

1. A blind dog navigation system comprising:
   a body harness, having pockets, suitable to be worn by a dog in the shoulder and torso region;
   a head band, suitable to be worn by the dog over the head and neck region;
   a microcontroller located in a pocket of the body harness;
   a frontal distance sensor attached to the head band and located on top of the dog's head pointing forward;
   a stimulator located in the body harness close to the dog's body;
   a power source located in a pocket of the body harness; and
   a wiring harness located across the body harness and the head band, which connects the microcontroller to the frontal distance sensor, the stimulator, and the power source.

2. The blind dog navigation system according to claim 1, wherein the frontal distance sensor transmits sending wave and receives returning wave signals.

3. The blind dog navigation system according to claim 2, where a lower distance sensor is attached to the front of the body harness between the dog's legs pointing forward and downward and connected to the microcontroller via the wiring harness.

4. The blind dog navigation system according to claim 3, wherein the lower distance sensor transmits sending wave and receives returning wave signals.

5. The blind dog navigation system according to claim 4, wherein a control panel is located in a pocket of the body harness and connected to the microcontroller via the wiring harness.

6. The blind dog navigation system according to claim 5, wherein the control panel is housed within a case.

7. The blind dog navigation system according to claim 6, wherein the control panel has a status light.

8. The blind dog navigation system according to claim 7, wherein the control panel has an On/Off button.

9. The blind dog navigation system according to claim 8, wherein the control panel has a learn button.

10. The blind dog navigation system according to claim 9, wherein the control panel has a reset button.

11. The blind dog navigation system according to claim 10, wherein an accelerometer is located in a pocket of the body harness and connected to the microcontroller via the wiring harness.

12. The blind dog navigation system according to claim 11, wherein the head band has opening for the dog's ears.

13. The blind dog navigation system according to claim 12, wherein the head band is in the form of an adjustable wrap with a fastening mechanism.

14. The blind dog navigation system according to claim 13, wherein the head band's fastening mechanism is a hook and loop.

15. A blind dog navigation system:
   Having a body harness with pockets, suitable to be worn by a dog in the shoulder and torso region;
   having a head band suitable to be worn by the dog over the head and neck region;
   mounting an ultrasound frontal distance sensor on the head band, where the ultrasound frontal distance sensor points forward and reports a forward object distance in its line of sight; wherein the forward object distance has a minimum forward distance parameter and a maximum forward distance parameter;
   mounting an ultrasound lower distance sensor on the chest region of the body harness, where the ultrasound lower distance sensor points forward and downward and reports a drop distance in its line of sight; wherein the drop distance and has a maximum drop distance parameter;
   mounting a forward collision stimulator on the body harness, which provides any combination of an audio and a haptic stimulation to the dog through the body harness;
   mounting a drop stimulator on the body harness, which provides any combination of an audio and a vibration stimulation to the dog through the body harness;
   having microcontroller with a logic program and a power source and an accelerometer; and
   having a wiring harness providing electrical connectivity among the ultrasound frontal distance sensor, the ultrasound lower distance sensor, the forward collision stimulator, the drop stimulator, microcontroller, the power source, and the accelerometer.

16. The blind dog navigation system according to claim 15, wherein the minimum forward distance parameter, the maximum forward distance parameter, and the maximum drop distance parameter are predetermined based on a safety preference provided by an owner of the dog.

17. The blind dog navigation system according to claim 16, wherein the parameter minimum forward distance parameter indicates a shortest acceptable distance between the dog and an obstacle.

18. The blind dog navigation system according to claim 17, wherein the parameter maximum forward distance parameter indicates a longest acceptable distance between the dog and an obstacle.

19. The blind dog navigation system according to claim 18, wherein the maximum drop distance parameter indicates the longest acceptable distance between the dog and a drop.

20. The blind dog navigation system according to claim 19, wherein the logic program monitors the status reported by the ultrasound frontal distance sensor and the ultrasound lower distance sensor.

21. The blind dog navigation system according to claim 20, wherein the logic program activates the forward collision stimulator when the ultrasound frontal distance sensor reports an obstacle within the minimum forward distance parameter and the maximum forward distance parameter range.

22. The blind dog navigation system according to claim 21, wherein the logic program activates the forward collision stimulator when the ultrasound frontal distance sensor reports an obstacle within the minimum forward distance parameter and the maximum forward distance parameter range, and increases the activation intensity of the forward collision stimulator as the forward object distance approaches the minimum forward distance parameter.

23. The blind dog navigation system according to claim 22, wherein the logic program activates the drop stimulator when the ultrasound lower distance sensor reports a drop at the maximum drop distance parameter distance from the dog.

24. The blind dog navigation system according to claim 23, wherein the logic program computes the forward velocity of the dog using the accelerometer.

25. The blind dog navigation system according to claim 24, wherein the logic program proportionally activates the forward collision stimulator earlier as a function of the forward velocity of the dog.

* * * * *